US007089665B2

(12) United States Patent
Chen et al.

(10) Patent No.: US 7,089,665 B2
(45) Date of Patent: Aug. 15, 2006

(54) METHOD FOR FABRICATING A MONOLITHIC FLUID INJECTION DEVICE

(75) Inventors: Wei-Lin Chen, Taipei (TW); Hung-Sheng Hu, Kaohsiung (TW); In-Yao Lee, Taipei (TW)

(73) Assignee: BENQ Corporation, Taoyuan (TW)

( * ) Notice: Subject to any disclaimer, the term of this patent is extended or adjusted under 35 U.S.C. 154(b) by 69 days.

(21) Appl. No.: 10/868,605

(22) Filed: Jun. 15, 2004

(65) Prior Publication Data

US 2004/0253755 A1 Dec. 16, 2004

(30) Foreign Application Priority Data

Jun. 16, 2003 (TW) ............................... 92116226 A

(51) Int. Cl.
*B21D 53/00* (2006.01)
*G01D 15/00* (2006.01)

(52) U.S. Cl. ......................... 29/890.1; 29/830; 29/831; 29/832; 29/854; 216/27

(58) Field of Classification Search ............... 29/890.1, 29/830, 831, 832, 854; 216/27; 347/65, 347/57, 58, 62; 438/21
See application file for complete search history.

(56) References Cited

U.S. PATENT DOCUMENTS 5,122,812 A * 6/1992 Hess et al. .................... 347/59
5,159,353 A * 10/1992 Fasen et al. .................. 347/59
5,563,637 A * 10/1996 Francis et al. ................ 347/32
6,102,530 A 8/2000 Kim et al.
6,231,153 B1 * 5/2001 Elgee .......................... 347/17

* cited by examiner

*Primary Examiner*—A. Dexter Tugbang
*Assistant Examiner*—Tai Van Nguyen
(74) *Attorney, Agent, or Firm*—Quintero Law Office

(57) ABSTRACT

A method for fabricating a monolithic fluid injection device. The method includes providing a substrate with a patterned sacrificial layer thereon. Next, a patterned support layer and a patterned resistive layer, as a heating element, are formed on the substrate sequentially. A patterned insulating layer having a heating element contact via and a first opening is formed on the support layer. A patterned conductive layer is formed on the support layer and fills the heating element contact via as a signal transmitting circuit. A patterned protective layer having a signal transmitting circuit contact via and a second opening corresponding to the first opening is formed on the substrate. A manifold is formed by wet etching the back of the substrate to expose the sacrificial layer. A chamber is formed by removing the sacrificial layer in the wet etching process. Finally, an opening connecting the chamber is formed by etching the support layer along the second opening.

21 Claims, 7 Drawing Sheets

METHOD FOR FABRICATING A MONOLITHIC FLUID INJECTION DEVICE

BACKGROUND OF THE INVENTION

1. Field of the Invention

The present invention relates to thermal ink-jet (TIJ) technology, and more particularly, to a method for fabricating a monolithic fluid injection device.

2. Description of the Related Art

The conventional fabrication technique of a monolithic fluid injection device typically includes standard integrated circuit (IC) technology and micro-electro-mechanical system (MEMS) technology for both front-end and back-end processes. The front-end process comprises formation of wafer driving circuits and heating elements in an IC foundry. The subsequent back-end process forms fluid chambers and orifices on said wafer in a MEMS foundry.

Both the IC and MEMS processes require one or several thin-film processing techniques, such as metal deposition, dielectric deposition, or etching of dielectric openings. Production costs and the probability of defects, however, increase with repeated thin-film processes.

Conventionally, a monolithic fluid injection device with various components, such as a fluid chamber, a heater, a driving circuit, and an orifice, is formed on a silicon wafer using a MEMS process without requiring packaging and thus results in higher yield and lower cost.

FIGS. 1A and 1B are schematic illustrations of a conventional monolithic fluid injection device fabrication process, wherein FIG. 1A shows the front-end IC process and FIG. 1B shows the back-end MEMS process. Referring to FIG. 1A, a substrate 10 (e.g., silicon wafer) having a first surface and a second surface is provided, and a monolithic fluid injection device is formed thereon. In a typical processing sequence, a patterned sacrificial layer 20 is formed on the first surface of the substrate 10. A patterned structure layer 30 is formed on the first surface of the substrate 10 and covers the patterned sacrificial layer 20. A patterned resistive layer 40 is formed on the structure layer 30 as a heater. A patterned insulating layer 50 having a heater contact opening 45 is formed over the structure layer 30. A patterned conductive layer 60 is formed overlying the structure layer 30 and fills the heater contact opening 45 as a signal transmitting circuit 62. A patterned protective layer 70, having a signal transmitting circuit contact opening and covering the insulating layer 50 and the conductive layer 60, is formed overlying the substrate 10.

Referring to FIG. 1B, the IC processed wafer is then subjected to wet etching. A fluid channel 80 is formed in the second surface of the substrate 10 and exposes the sacrificial layer 20. The sacrificial layer 20 is then removed to form a fluid chamber 90. Thereafter the protective layer 70, the insulating layer 50, the structure layer 30, an orifice 90 connecting the fluid chamber 95 are formed sequentially by lithographic etching. Thus, formation of a monolithic fluid injection device is complete.

The above described formation of the orifice 90 minimally requires etching of the protective layer 70, the insulating layer 50, and the structure layer 30. The front-end process, however, also requires etching of the protective layer 70 and the insulating layer 50 to form an electrical connection between the signal transmitting circuit 62 and the heater 40 to form a signal transmitting contact.

A monolithic fluid injection device combining IC and MEMS processes is disclosed in U.S. Pat. No. 6,102,530. In this method, a structure layer is suspended over the fluid chamber; hence, the process must be precisely controlled to improve production yield and reliability.

SUMMARY OF THE INVENTION

An object of the present invention is to provide a less complex method of fabricating a monolithic fluid injection device. By merging part of back-end MEMS process with the front-end IC process, overall process efficiency is improved.

According to the object mentioned above, the present invention provides a method for fabricating a monolithic fluid injection device. A substrate having a first surface and a second surface is provided. A patterned sacrificial layer is formed on the first surface of the substrate. A patterned structure layer is formed on the first surface of the substrate and covers the patterned sacrificial layer. A patterned resistive layer is formed on the structure layer as a heater. A patterned insulating layer having a heater contact opening and a first opening is formed on the structure layer, wherein at least a portion of the heater is exposed through the heater contact opening. A patterned conductive layer is formed overlying the structure layer and connecting the heater via the heater contact opening to form a signal transmitting circuit. A patterned protective layer having a signal transmitting circuit contact opening and a second opening corresponding to the first opening is formed overlying the substrate and covers the insulating layer and the conductive layer. A fluid channel in the second surface of the substrate, opposing the first surface, is formed and exposes the sacrificial layer. The sacrificial layer is removed to form a fluid chamber. The structure layer is etched along the second and the first opening to form an orifice connecting the fluid chamber.

According to the object mentioned above, the present invention provides another method for fabricating a monolithic fluid injection device. A substrate having a first surface and a second surface is provided. A patterned sacrificial layer is formed on the first surface of the substrate. A patterned structure layer is formed on the first surface of the substrate and covers the patterned sacrificial layer. A patterned resistive layer is formed on the structure layer as a heater. A patterned insulating layer having a heater contact opening is formed on the structure layer, wherein at least a portion of the heater is exposed through the heater contact opening. A patterned conductive layer is formed overlying the structure layer and connecting the heater via the heater contact opening to form a signal transmitting circuit. A patterned protective layer is formed overlying the substrate and covers the insulating layer and the conductive layer. A fluid channel in the second surface of the substrate, opposing the first surface, is formed and exposes the sacrificial layer. The sacrificial layer is removed to form a fluid chamber. The protective layer, the insulating layer, and the structure layer are etched to form an orifice connecting the fluid chamber The present invention provides still another method for fabricating a monolithic fluid injection device. A substrate having a first surface and a second surface is provided. A patterned sacrificial layer is formed on the first surface of the substrate. A patterned structure layer is formed on the first surface of the substrate and covers the patterned sacrificial layer. A patterned resistive layer is formed on the structure layer as a heater. A patterned insulating layer having a heater contact opening is formed on the structure layer, wherein at least a portion of the heater is exposed through the heater contact opening. A patterned conductive layer is formed overlying the structure layer and fills the heater contact opening to form a signal transmitting circuit. A patterned protective layer is formed overlying the substrate and covers the insulating layer and the conductive layer. The protective layer and the insulating layer are etched to form an opening. A fluid channel is formed in the second surface of the substrate, opposing the first surface, and exposes the sacrificial layer. The sacrificial layer is removed to form a fluid chamber. The structure layer is etched along the opening to form an orifice connecting the fluid chamber The present invention further provides another method for fabricating a monolithic fluid injection device. A substrate having a first surface and a second surface is provided. A patterned sacrificial layer is formed on the first surface of the substrate. A patterned structure layer is formed on the first surface of the substrate and covers the patterned sacrificial layer. A conductive layer is formed on the structure layer. A patterned resistive layer is formed on the conductive layer as a heater. The conductive layer is patterned to form a signal transmitting circuit. A protective layer is formed overlying the substrate and covers the structure layer, the conductive layer, and the resistive layer. The protective layer is etched to form an opening. A fluid channel is formed in the second surface of the substrate, opposing the first surface, and exposes the sacrificial layer. The sacrificial layer is removed to form a fluid chamber. The structure layer is etched along the opening to form an orifice connecting the fluid chamber.

The present invention provides yet another method for fabricating a monolithic fluid injection device. A substrate having a first surface and a second surface is provided. A patterned sacrificial layer is formed on the first surface of the substrate. A patterned structure layer is formed on the first surface of the substrate and covers the patterned sacrificial layer. A conductive layer is formed on the structure layer. A patterned resistive layer is formed on the conductive layer as a heater. The conductive layer is patterned to form a signal transmitting circuit. A protective layer is formed overlying the substrate and covers the structure layer, the conductive layer, and the resistive layer. A fluid channel is formed on a second surface of the substrate, opposing the first surface, and exposing the sacrificial layer. The sacrificial layer is removed to form a fluid chamber. The protective layer and the structure layer is etched sequentially to form an orifice connecting the fluid chamber The advantage of the present invention is providing a hybrid integrated process for fabricating the orifice of a monolithic fluid injection device. More specifically, integrating portions of the back-end MEMS and front-end IC processes, reduces process cost improves yield.

BRIEF DESCRIPTION OF THE DRAWINGS

The present invention can be more fully understood by reading the subsequent detailed description in conjunction with the examples and references made to the accompanying drawings, wherein:

FIGS. 1A and 1B are schematic illustrations of the conventional monolithic fluid injection device fabrication process, wherein FIG. 1A shows the front-end IC process and FIG. 1B shows the back-end MEMS process;

FIGS. 2A to 2F are cross-sections illustrating the manufacture of a monolithic fluid injection device according to the first embodiment of the invention, wherein FIGS. 2A to 2D show the front-end IC process and FIGS. 2E to 2F show the back-end MEMS process;

FIGS. 3A to 3C are cross-sections illustrating the manufacture of a monolithic fluid injection device according to the second embodiment of the invention, wherein FIG. 3A shows the front-end IC process and FIGS. 3B and 2C show the back-end MEMS process;

FIGS. 4A to 4C are cross-sections illustrating the manufacture of a monolithic fluid injection device according to the third embodiment of the invention, wherein FIG. 4A shows the front-end IC process and FIGS. 4B and 4C show the back-end MEMS process; and FIGS. 5A to 5D are cross-sections illustrating the manufacture of a monolithic fluid injection device according to the fourth embodiment of the invention, wherein FIGS. 5A and 5B show the front-end IC process and FIGS. 5C and 5D show the back-end MEMS process.

DETAILED DESCRIPTION OF THE INVENTION

First Embodiment

Figure 1A:
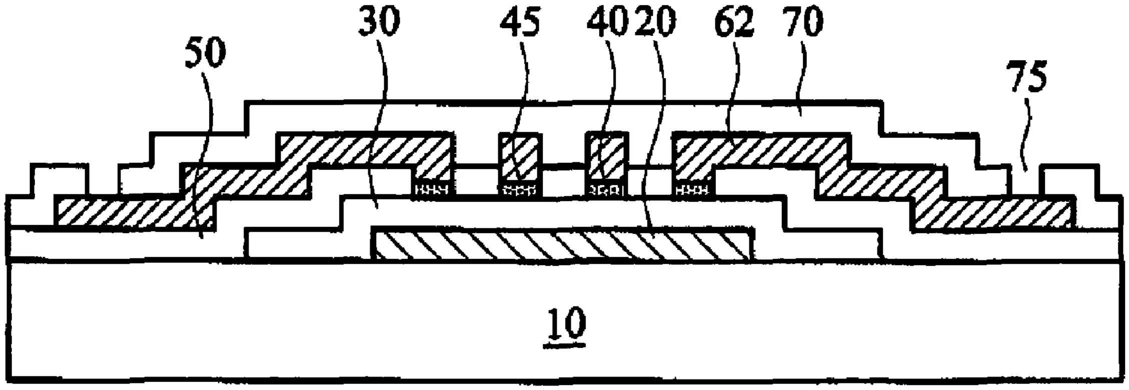
FIG. 1A (RELATED ART)
Figure 1B:
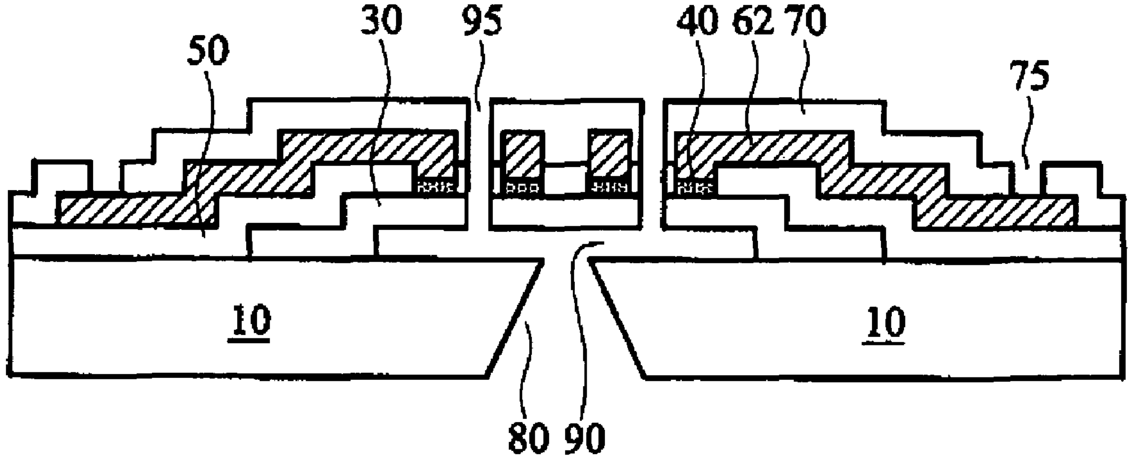
FIG. 1B (RELATED ART)
Figure 2A:
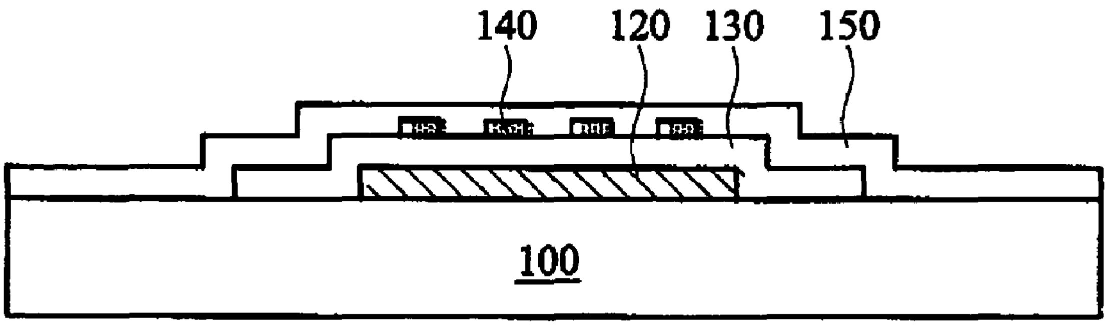
Figure 2B:
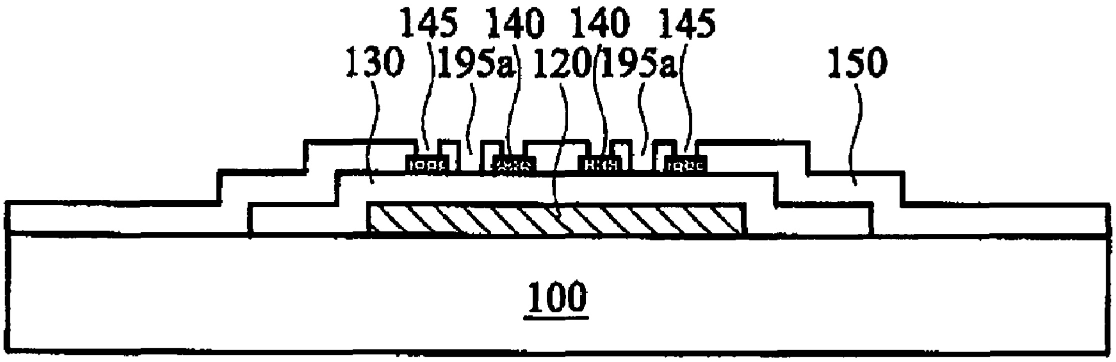
Figure 2C:
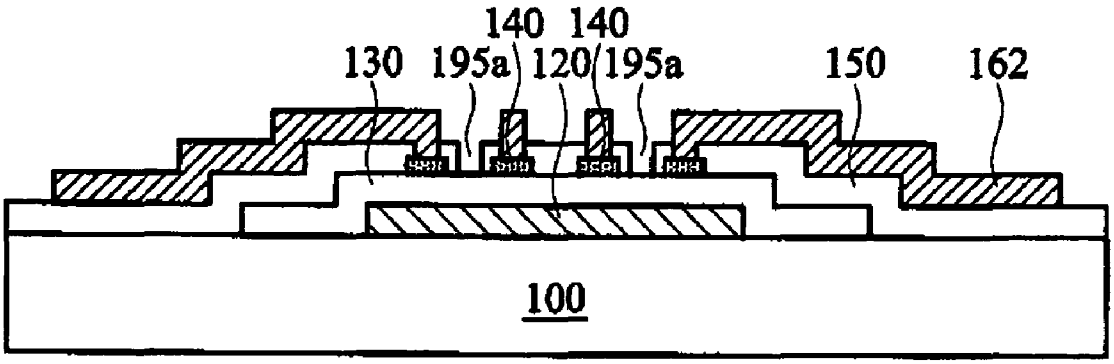
Figure 2D:
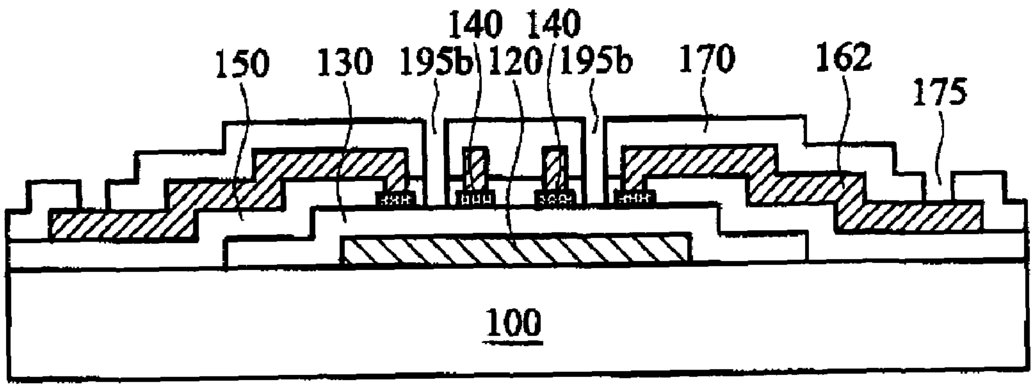
Figure 2E:
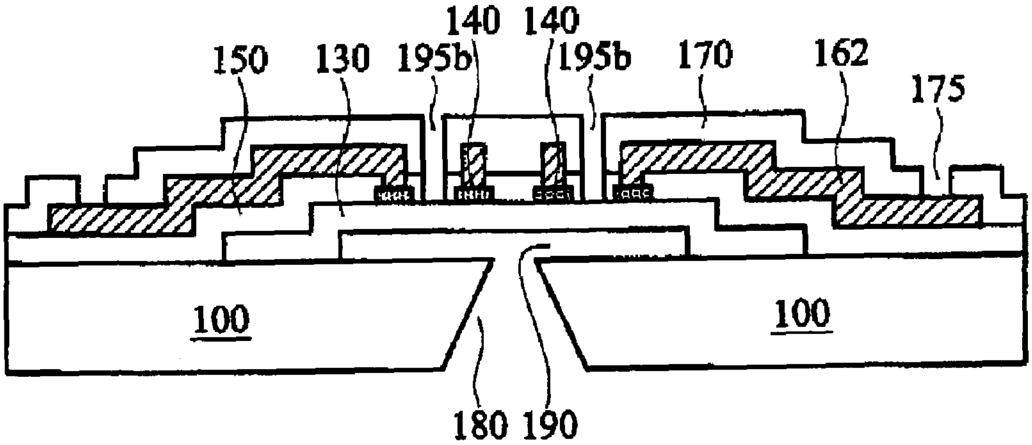
Figure 2F:
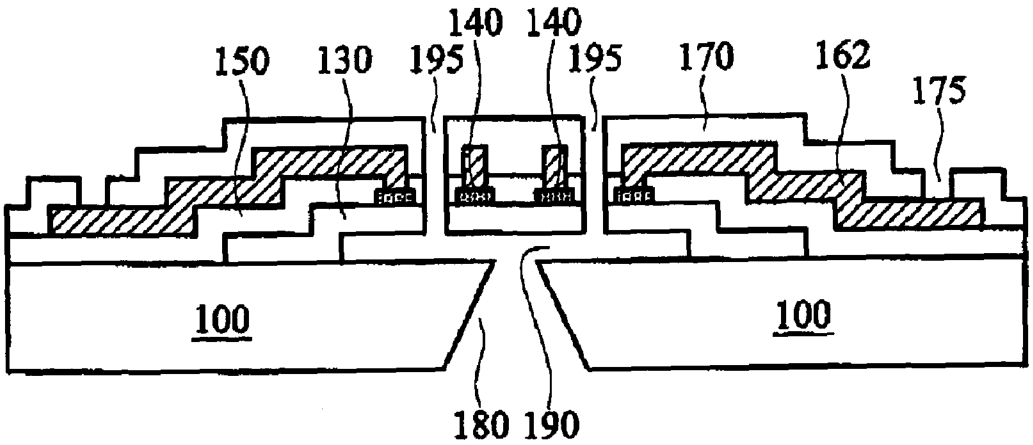

FIGS. 2A to 2F are cross-sections illustrating the manufacture of a monolithic fluid injection device according to the first embodiment of the invention, wherein FIGS. 2A to 2D show the front-end IC process and FIGS. 2E to 2F show the back-end MEMS process. Referring to FIG. 2A, a patterned sacrificial layer 120 is formed on a substrate 100 (e.g. a silicon wafer) having a first surface and a second surface. The sacrificial layer 120 comprises borophosphosilicate glass (BPSG), phosphosilicate glass (PSG), or silicon oxide. The sacrificial layer 120 may be deposited using a CVD or LPCVD process. In a typical processing sequence, a structure layer 130 is conformally formed on the first surface of the substrate 100 and covers the patterned sacrificial layer 120. The structure layer 130 comprises silicon oxide. The structure layer 130 may be deposited using a CVD or a LPCVD process. A patterned resistive layer 140 is formed on the structure layer 130 as a heater. The resistive layer 140 comprises $HfB_2$, TaAl, TaN, or TiN. The resistive layer 140 may be deposited using a PVD process, such as evaporation, sputtering, or reactive sputtering. A blanket insulating layer 150 is formed on the Structure layer 130.

Referring to FIG. 2B, lithographic etching is performed to define the insulating layer 150 to form a heater contact opening 145 and a first opening 195*a*. The first opening 195*a* maybe a precursor of an orifice of a monolithic fluid injection device.

Referring to FIG. 2C, a patterned conductive layer 162, comprising Al, Cu, or alloys thereof, is formed overlying the structure layer 130 and fills the heater contact opening 145 to form a signal transmitting circuit 162. The conductive layer 162 may be deposited using a PVD process, such as evaporation, sputtering, or reactive sputtering.

Referring to FIG. 2D, a protective layer 170 is formed overlying the substrate 100. Next, lithographic etching is performed to define the protective layer 170. Therefore, a signal transmitting circuit contact opening 175 is formed and exposes the underlying conductive layer 162 for subsequent packaging. The insulating layer 150 is etched along the first opening 195*a* and transformed to a second opening 195*b* as a precursor of the orifice of the monolithic fluid injection device.

Referring to FIG. 2E, a fluid channel 180 is formed in the second surface of the substrate 100 and exposes the sacrificial layer 120. The sacrificial layer 120 is then removed to form a fluid chamber 190.

Referring to FIG. 2F, the structure layer 130 is etched by lithography along the second opening 195*b* to form an orifice 190 connecting the fluid chamber 195. The lithographic etching comprises plasma etching, chemical dry etching, reactive ion etching, and laser etching. Thus, formation of a monolithic fluid injection device is complete.

Second Embodiment

Figure 3A:
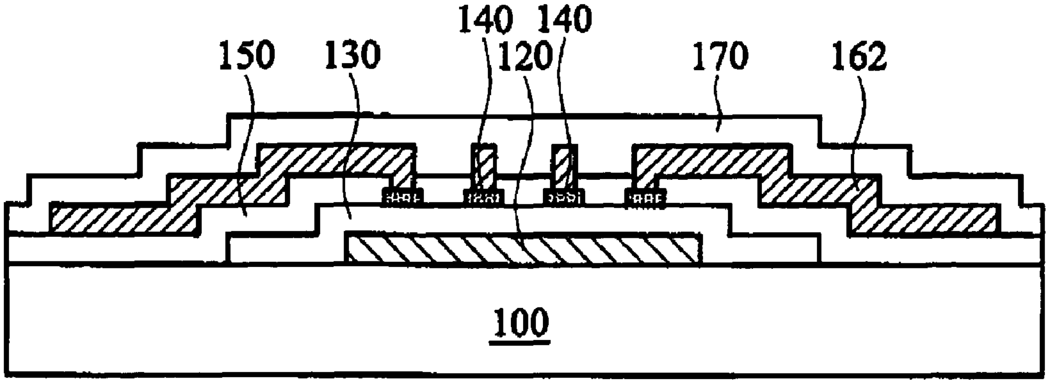
Figure 3B:
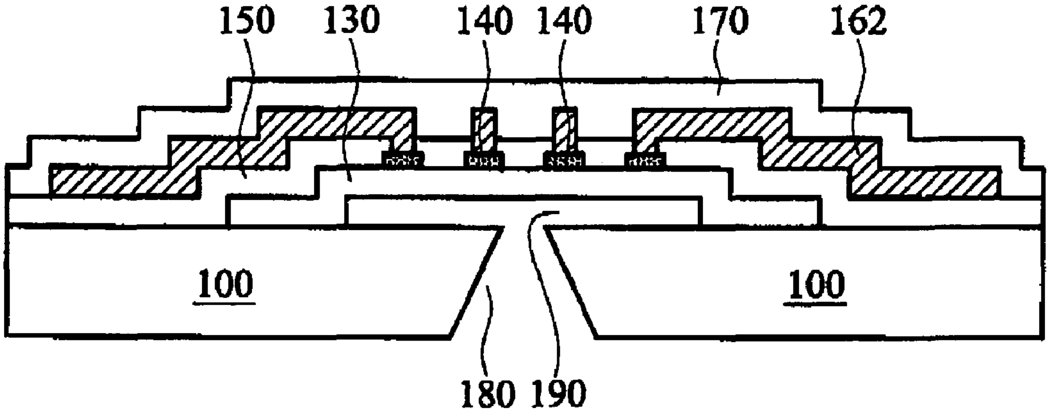
Figure 3C:
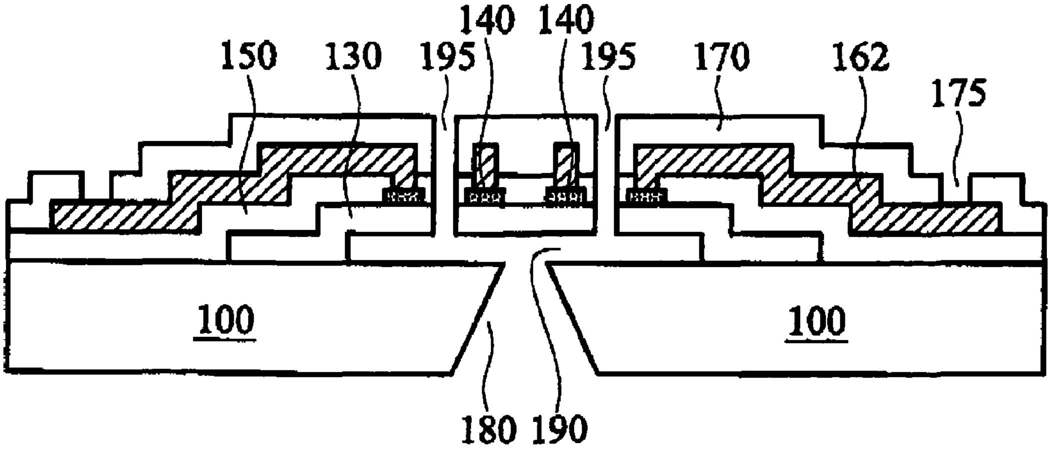

FIGS. 3A to 3C are cross-sections illustrating the manufacture of a monolithic fluid injection device according to the second embodiment of the invention, wherein FIG. 3A shows the front-end IC process and FIGS. 3B and 2C show the back-end MEMS process. Referring to FIG. 3A, a patterned sacrificial layer 120 is formed on a substrate 100 (e.g. a silicon wafer) having a first surface and a second surface. The sacrificial layer 120 comprises borophosphosilicate glass (BPSG), phosphosilicate glass (PSG), or silicon oxide. The sacrificial layer 120 may be deposited using a CVD or LPCVD process. In a typical processing sequence, a structure layer 130 is conformally formed on the first surface of the substrate 100 and covers the patterned sacrificial layer 120. The structure layer 130 comprises silicon oxide. The structure layer 130 may be deposited using a CVD or LPCVD process. A patterned resistive layer 140 is formed on the structure layer 130 as a heater. The resistive layer 140 comprises $HfB_2$, TaAl, TaN, or TiN. The resistive layer 140 may be deposited using a PVD process, such as evaporation, sputtering, or reactive sputtering. A blanket insulating layer 150 is formed on the structure layer 130.

Next, lithographic etching is performed to define a heater contact opening 145. Thereafter, a patterned conductive layer 162, comprising Al, Cu, or alloys thereof, is formed overlying the structure layer 130 and fills the heater contact opening 145 to form a signal transmitting circuit 162. The conductive layer 162 may be deposited using a PVD process, such as evaporation, sputtering, or reactive sputtering. A protective layer 170 is formed overlying the substrate 100 and covers the insulating layer 150 and the signal transmitting circuit 162.

Referring to FIG. 3B, a fluid channel 180 is formed in the second surface of the substrate 100 and exposes the sacrificial layer 120. The sacrificial layer 120 is then removed to form a fluid chamber 190.

Referring to FIG. 3C, lithographic etching is performed to sequentially penetrate the protective layer 170, insulating layer 150, and the structure layer 130, forming an orifice 190 to connect the fluid chamber 195. Alternately, a signal transmitting circuit contact opening 175 is simultaneously formed exposing the underlying conductive layer 162 for subsequent packaging. The lithographic etching comprises plasma etching, chemical dry etching, reactive ion etching, or laser etching. Thus, formation of a monolithic fluid injection device is complete.

Third Embodiment

Figure 4A:
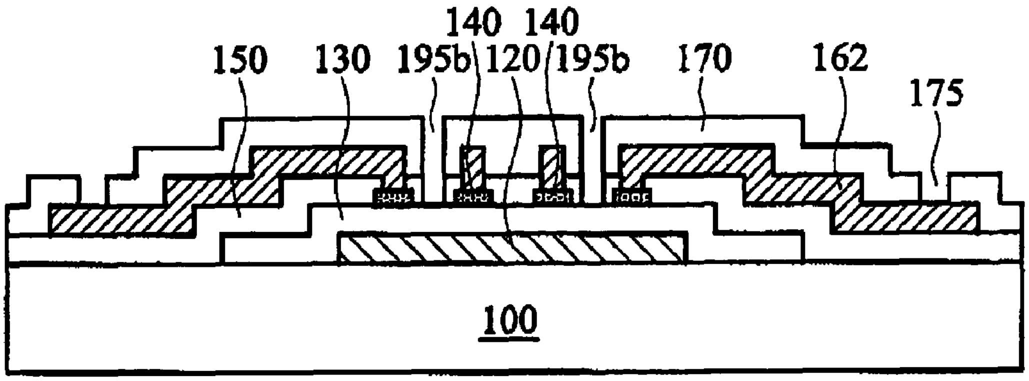
Figure 4B:
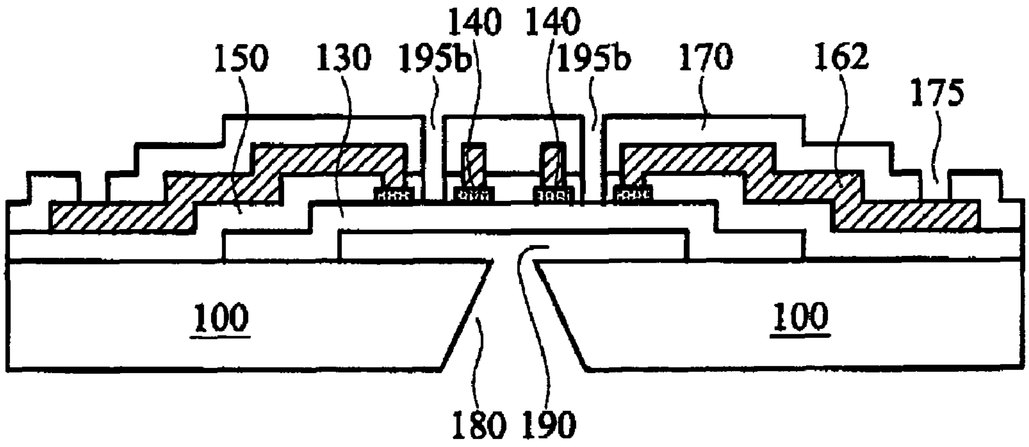
Figure 4C:
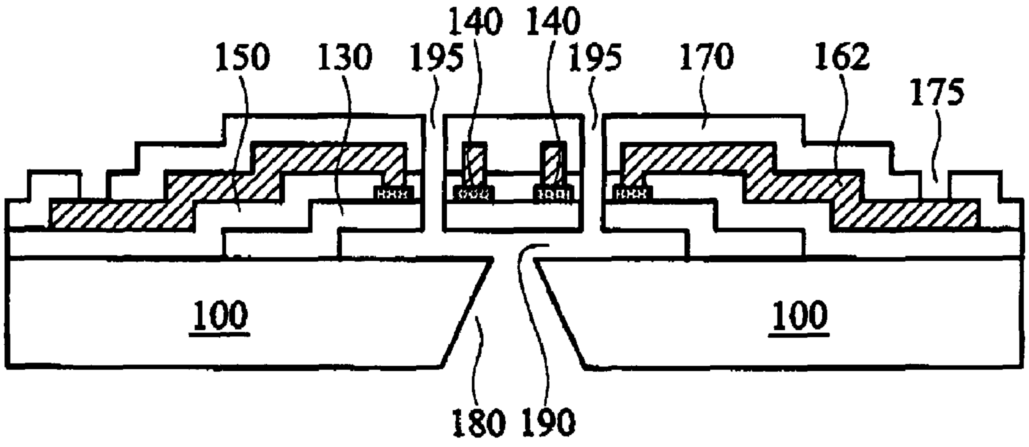

FIGS. 4A to 4C are cross-sections illustrating the manufacture of a monolithic fluid injection device according to the third embodiment of the invention, wherein FIG. 4A shows the front-end IC process and FIGS. 4B and 4C show the back-end MEMS process. Referring to FIG. 2A, a patterned sacrificial layer 120 is formed on a substrate 100 (e.g. a silicon wafer) having a first surface and a second surface. The sacrificial layer 120 comprises borophosphosilicate glass (SPSG), phosphosilicate glass (PSG), or silicon oxide. The sacrificial layer 120 may be deposited using a CVD or LPCVD process. In a typical processing sequence, a structure layer 130 is conformally formed on the first surface of the substrate 100 and covers the patterned sacrificial layer 120. The structure layer 130 comprises a silicon nitride. The structure layer 130 may be deposited using a CVD or LPCVD process. A patterned resistive layer 140 is formed on the structure layer 130 as a heater. The resistive layer 140 comprises $HfB_2$, TaAl, TaN, or TiN. The resistive layer 140 may be deposited using a PVD process, such as evaporation, sputtering, or reactive sputtering. A blanket insulating layer 150 is formed on the structure layer 130. Thereafter, lithographic etching is performed to define the insulating layer 150 and form a heater contact opening 145.

Next, a patterned conductive layer 162, comprising Al, Cu, or alloys thereof, is formed overlying the structure layer 130 and fills the heater contact opening 145 to form a signal transmitting circuit 162. The conductive layer 162 may be deposited using a PVD process, such as evaporation, sputtering, or reactive sputtering. A protective layer 170 is formed overlying the substrate 100. Lithographic etching is then performed to define the protective layer 170, thereby forming a signal transmitting circuit contact opening 175 and exposing the underlying conductive layer 162 for subsequent packaging. The protective layer 170 and the insulating layer 150 are etched to form a second opening 195*b* as a precursor of the orifice of the monolithic fluid injection device.

Referring to FIG. 4B, a fluid channel 180 is formed in the second surface of the substrate 100 and exposes the sacrificial layer 120. The sacrificial layer 120 is then removed to form a fluid chamber 190.

Referring to FIG. 4C, the structure layer 130 is etched by lithography along the second opening 195*b* to form an orifice 190 connecting the fluid chamber 195. Thus, formation of a monolithic fluid injection device is complete.

Fourth Embodiment

Figure 5A:
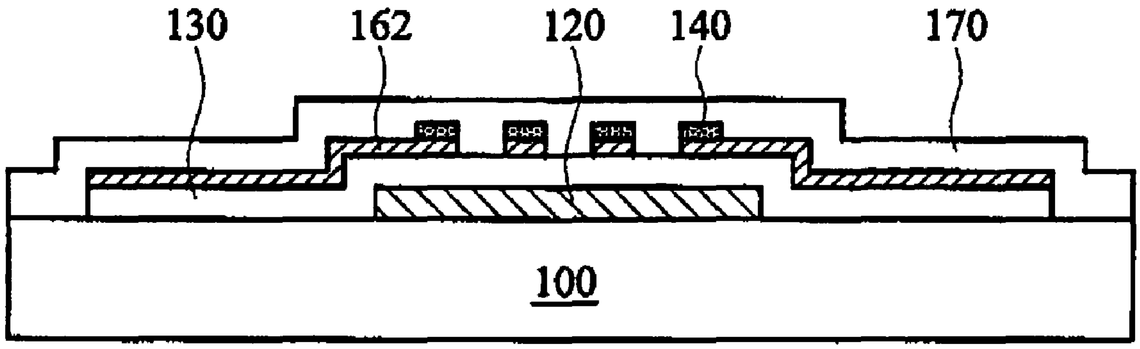
Figure 5B:
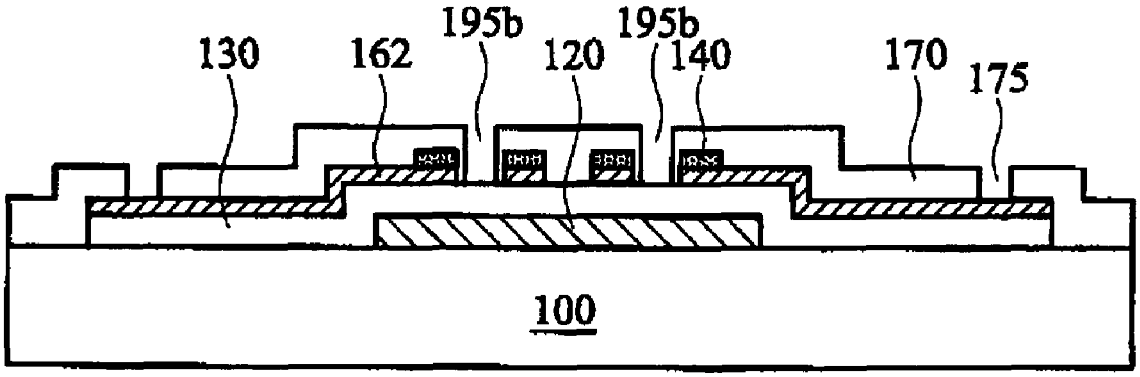
Figure 5C:
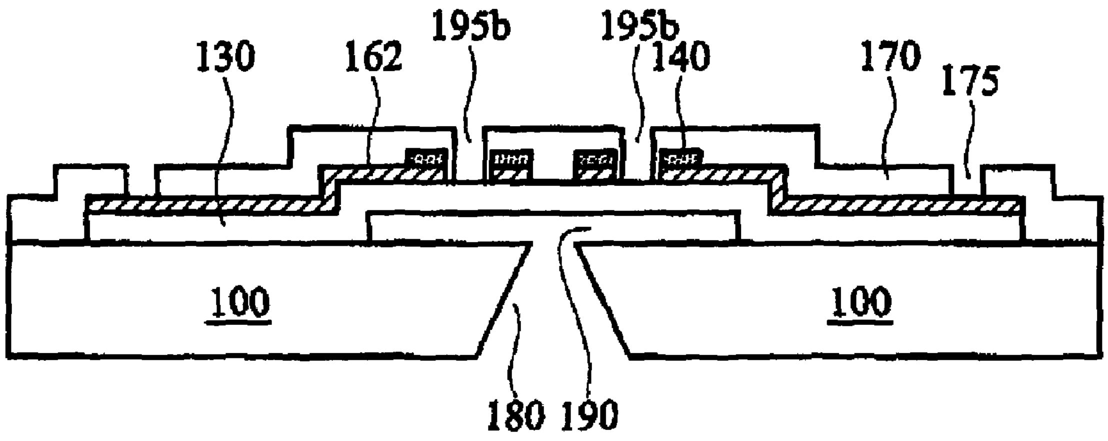
Figure 5D:
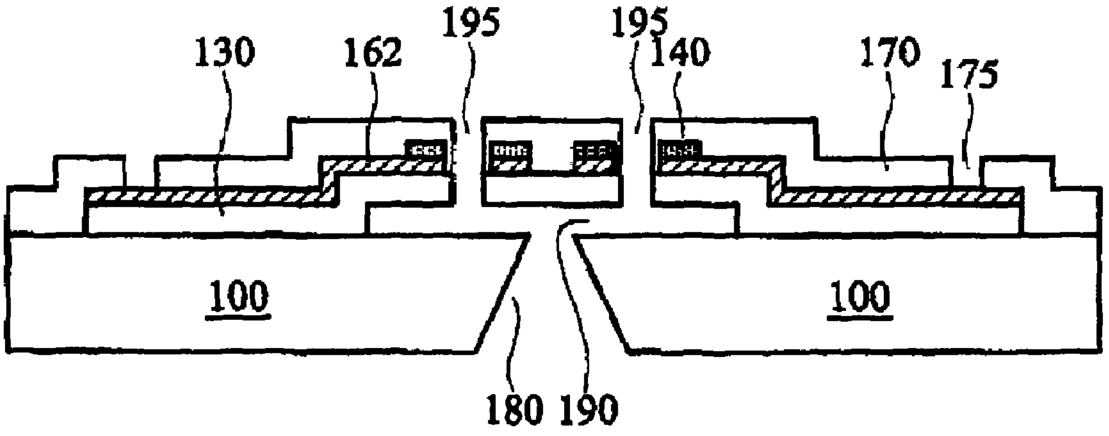

FIGS. 5A to 5D are cross-sections illustrating the manufacture of a monolithic fluid injection device according to the fourth embodiment of the invention, wherein FIGS. 5A and 5B show the front-end IC process and FIGS. 5C and 5D show the back-end MEMS process. Referring to FIG. 5A, a patterned sacrificial layer 120 is formed on a substrate 100 (e.g. a silicon wafer) having a first surface and a second surface. The sacrificial layer 120 comprises borophosphosilicate glass (BPSG), phosphosilicate glass (PSG), or silicon oxide. The sacrificial layer 120 may be deposited using a CVD or LPCVD process. In a typical processing sequence, a structure layer 130 is conformally formed on the first surface of the substrate 100 and covers the patterned sacrificial layer 120. The structure layer 130 is composed of silicon oxide. The structure layer 130 may be deposited using a CVD or LPCVD process. Next, a conductive layer 162, comprising Al, Cu, or alloys thereof, is formed overlying the structure layer 130. The conductive layer 162 may be deposited using a PVD process, such as evaporation, sputtering, or reactive sputtering. A resistive layer 140 is formed on the structure layer 130 as a heater. The resistive layer 140 comprises $HfB_2$, TaAl, TaN, or TiN. The resistive layer 140 may be deposited using a PVD process, such as evaporation, sputtering, or reactive sputtering. The resistive layer 140 is patterned to form a signal transmitting circuit 162. A blanket protective layer 170 is formed on the structure layer 130 and covers the resistive layer 140 and the signal transmitting circuit 162.

Referring to FIG. 5B, lithographic etching is performed to define the protective layer 170 to form a heater contact opening 145. During the etching process, the signal transmitting circuit 162 may be used as an etch stopper. Simultaneously, the protective layer 170 is etched to form an opening 195*b* as a precursor of the orifice of the monolithic fluid injection device.

Referring to FIG. 5C, a fluid channel 180 is formed in the second surface of the substrate 100 and exposes the sacrificial layer 120. The sacrificial layer 120 is then removed to form a fluid chamber 190.

Referring to FIG. 5D, the structure layer 130 is etched by lithography along the opening 195*b* to form an orifice 190 connecting the fluid chamber 195. The lithographic etching comprises plasma etching, chemical dry etching, reactive ion etching, and laser etching. Thus, formation of a monolithic fluid injection device is complete.

Fifth Embodiment

Referring again to FIG. 5A, a patterned sacrificial layer 120 is formed on a substrate 100 (e.g. a silicon wafer) having a first surface and a second surface. The sacrificial layer 120 comprises borophosphosilicate glass (BPSG), phosphosilicate glass (PSG), or silicon oxide. The sacrificial layer 120 may be deposited using a CVD or LPCVD process. In a typical processing sequence, a structure layer 130 is conformally formed on the first surface of the substrate 100 and covers the patterned sacrificial layer 120. The structure layer 130 comprises silicon oxide. The structure layer 130 may be deposited using a CVD or LPCVD process. Next, a conductive layer 162, comprising Al, Cu, or alloys thereof, is formed overlying the structure layer 130. The conductive layer 162 may be deposited using a PVD process, such as evaporation, sputtering, or reactive sputtering. A resistive layer 140 is formed on the structure layer 130 as a heater. The resistive layer 140 comprises $HfB_2$, TaAl, TaN, or TiN. The resistive layer 140 may be deposited using a PVD process, such as evaporation, sputtering, or reactive sputtering. The resistive layer 140 is patterned to form a signal transmitting circuit 162. A blanket protective layer 170 is formed on the structure layer 130 and covers the resistive layer 140 and the signal transmitting circuit 162.

Referring again to FIG. 5C, a fluid channel 180 is formed in the second surface of the substrate 100 and exposes the sacrificial layer 120. The sacrificial layer 120 is then removed to form a fluid chamber 190.

Next, lithographic etching is performed to define the protective layer 170, and form a heater contact opening 145. During the etching process, the signal transmitting circuit 162 may be used as an etch stopper. The protective layer 170 and the structure layer 130 are simultaneously etched to form an orifice 190 connecting the fluid chamber 195. The lithographic etching comprises plasma etching, chemical dry etching, reactive ion etching, and laser etching. Thus, formation of a monolithic fluid injection device is complete.

The primary advantage of the described preferred embodiments lies in the hybrid integrated process for fabricating the orifice of a monolithic fluid injection device.

More specifically, the invention integrates portions of the back-end MEMS and front-end IC processes, thus reducing overall process costs and increasing yield. Additionally, the orifice of the monolithic fluid injection device can also be improved.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for fabricating a monolithic fluid injection device, comprising the steps of:

providing a substrate having a first surface and a second surface;

forming a patterned sacrificial layer on the first surface of the substrate;

forming a patterned structure layer on the first surface of the substrate and covering the patterned sacrificial layer;

forming a patterned resistive layer on the structure layer as a heater;

forming a patterned insulating layer on the structure layer, the patterned insulating layer having a heater contact opening and a first opening, wherein the heater contact opening exposes at least part of the heater;

forming a patterned conductive layer overlying the structure layer and connecting the heater via the heater contact opening to form a signal transmitting circuit;

forming a patterned protective layer overlying the substrate and covering the insulating layer and the conductive layer, the protective layer having a signal transmitting circuit contact opening and a second opening corresponding to the first opening;

forming a fluid channel in the second surface of the substrate, opposing the first surface, and exposing the sacrificial layer;

removing the sacrificial layer to form a fluid chamber; and etching the structure layer along the first and second openings to form an orifice connecting the fluid chamber, wherein the heater contact opening and the first opening are formed simultaneously.

2. The method as claimed in claim 1, wherein the step of forming the fluid channel is performed by wet etching.

3. The method as claimed in claim 1, wherein the step of removing the sacrificial layer is performed by wet etching.

4. The method as claimed in claim 1, wherein the patterned protective layer further comprises a signal transmitting circuit contact opening, the signal transmitting circuit contact opening exposing at least part of the signal transmitting circuit.

5. The method as claimed in claim 4, wherein the signal transmitting circuit contact opening and the second opening are formed simultaneously.

6. The method as claimed in claim 1, wherein the step of etching the structure layer includes plasma etching, chemical dry etching, reactive ion etching, or laser etching.

7. The method as claimed in claim 1, wherein material of the sacrificial layer includes borophosphosilicate glass (BPSG), phosphosilicate glass (PSG), or silicon oxide.

8. The method as claimed in claim 1, wherein material of the structure layer includes silicon nitride.

9. The method as claimed in claim 1, wherein material of the resistive layer includes $HfB_2$, TaAl, TaN, or TiN.

10. The method as claimed in claim 1, wherein material of the resistive layer includes Al, Cu, or alloys thereof.

11. The method as claimed in claim 1, wherein material of the insulating layer includes silicon oxide.

12. The method as claimed in claim 1, wherein material of the protective layer includes silicon oxide, silicon nitride, silicon carbide, or a stacked structure thereof.

13. A method for fabricating a monolithic fluid injection device, comprising the steps of:

providing a substrate having a first surface and a second surface;

forming a patterned sacrificial layer on the first surface of the substrate;

forming a patterned structure layer on the first surface of the substrate and covering the patterned sacrificial layer;

forming a patterned resistive layer on the structure layer as a heater, wherein the heater connecting a patterned conductive layer of a signal transmitting circuit;

forming a protective layer overlying the substrate;

forming a fluid channel in the second surface of the substrate, opposing the first surface, and exposing the sacrificial layer;

removing the sacrificial layer to form a fluid chamber; and forming an orifice connecting the fluid chamber;

wherein the protective layer is patterned simultaneously forming a signal transmitting circuit contact opening connecting the patterned conductive layer and an opening connecting the fluid chamber.

14. The method as claimed in claim 13, further comprising:

forming a patterned insulating layer on the structure layer, the patterned insulating layer having a heater contact opening, wherein the heater contact opening exposing at least part of the heater; and forming a patterned conductive layer overlying the structure layer and connecting the heater via the heater contact opening to form the signal transmitting circuit, wherein the protective layer covers the insulating layer and the conductive layer.

15. The method as claimed in claim 14, wherein the protective layer further comprises a signal transmitting circuit contact opening, the signal transmitting circuit contact opening exposing at least part of the signal transmitting circuit.

16. The method as claimed in claim 13, further comprising:

forming a patterned insulating layer on the structure layer, the patterned insulating layer having a heater contact opening, wherein the heater contact opening exposing at least part of the heater;

forming a patterned conductive layer overlying the structure layer and filling the heater contact opening to form the signal transmitting circuit; and etching at least the protective layer and the insulating layer to form an opening.

17. The method as claimed in claim 16, wherein the protective layer further comprises a signal transmitting circuit contact opening, wherein the signal transmitting circuit contact opening exposing at least part of the signal transmitting circuit.

18. The method as claimed in claim 16, wherein forming the opening includes etching part of the structure layer.

19. The method as claimed in claim 16, further comprising:

forming a conductive layer on the structure layer;

forming a patterned resistive layer on the conductive layer as a heater;

patterning the conductive layer to form a signal transmitting circuit; and etching the protective layer to form an opening.

20. The method as claimed in claim 19, wherein the patterned protective layer further comprises a signal transmitting circuit contact opening, the signal transmitting circuit contact opening exposing at least part of the signal transmitting circuit.

21. The method as claimed in claim 13, further comprising:

forming a conductive layer on the structure layer;

forming a patterned resistive layer on the conductive layer as a heater; and patterning the conductive layer to form a signal transmitting circuit.

* * * * *